United States Patent
Ishito et al.

(10) Patent No.: US 9,688,917 B2
(45) Date of Patent: Jun. 27, 2017

(54) HYDROCARBON-PRODUCING APPARATUS AND HYDROCARBON-PRODUCING METHOD

(71) Applicants: Japan Oil, Gas and Metals National Corporation, Tokyo (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel & Sumikin Engineering Co., Ltd., Tokyo (JP)

(72) Inventors: Yukifumi Ishito, Tokyo (JP); Junichi Inoue, Tokyo (JP); Masaki Shingu, Tokyo (JP); Haruki Nagano, Tokyo (JP); Kazuhiko Tasaka, Tokyo (JP)

(73) Assignees: Japan Oil, Gas and Metals National Corporation, Tokyo (JP); INPEX CORPORATION, Tokyo (JP); JX Nippon Oil & Energy Corporation, Tokyo (JP); Japan Petroleum Exploration Co., Ltd., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 14/779,917

(22) PCT Filed: Mar. 19, 2014

(86) PCT No.: PCT/JP2014/057562
§ 371 (c)(1),
(2) Date: Sep. 24, 2015

(87) PCT Pub. No.: WO2014/156893
PCT Pub. Date: Oct. 2, 2014

(65) Prior Publication Data
US 2016/0046869 A1    Feb. 18, 2016

(30) Foreign Application Priority Data

Mar. 29, 2013 (JP) ................................. 2013-073223

(51) Int. Cl.
$C10G\ 2/00$ (2006.01)
$B01J\ 8/22$ (2006.01)

(52) U.S. Cl.
CPC ............. C10G 2/342 (2013.01); B01J 8/22 (2013.01); C10G 2/32 (2013.01)

(58) Field of Classification Search
CPC ........ C10G 2/342; C10G 2/344; C07C 1/042; B01J 8/22
See application file for complete search history.

(56) References Cited

U.S. PATENT DOCUMENTS

| | | | |
|---|---|---|---|
| 4,504,691 A * | 3/1985 | Hsia | C10G 50/00 585/519 |
| 9,421,509 B2 * | 8/2016 | Arai | C10G 2/00 |
| 2012/0172458 A1 | 7/2012 | Onishi | |

FOREIGN PATENT DOCUMENTS

| | | |
|---|---|---|
| CA | 2830076 A1 | 9/2012 |
| CA | 2830615 A1 | 10/2012 |
| EP | 2687578 A1 | 1/2014 |
| JP | 2004323626 A | 11/2004 |
| JP | 2007516065 A | 6/2007 |

(Continued)

OTHER PUBLICATIONS

International Search Report issued Jun. 24, 2014 in International Application No. PCT/JP2014/057562.

(Continued)

Primary Examiner — Lessanework Seifu
(74) Attorney, Agent, or Firm — Panitch Schwarze Belisario & Nadel LLP

(57) ABSTRACT

In the hydrocarbon-producing apparatus, a vapor-liquid separation tank of a second vapor-liquid separation unit is provided with a filling material layer. A vapor-liquid sepa- (Continued)

ration tank of the first vapor-liquid separation unit has a first return line. The vapor-liquid separation tank of the second vapor-liquid separation unit has a second return line. A light component of light oil discharged from a bottom of the vapor-liquid separation tank is returned to a portion between a top side above a return-location from the second return line within the vapor-liquid separation tank of the second vapor-liquid separation unit, and a line directly connected with a cooler installed on the first vapor-liquid separation unit through the first return line. A heavy component of light oil discharged from a bottom of the vapor-liquid separation tank of the second vapor-liquid separation unit is returned to the filling material layer through the second return line.

8 Claims, 3 Drawing Sheets

(56) References Cited

FOREIGN PATENT DOCUMENTS

| | | |
|---|---|---|
| JP | 2012193302 A | 10/2012 |
| WO | 2005005038 A1 | 1/2005 |
| WO | 2011024650 A1 | 3/2011 |
| WO | 2012124701 A1 | 9/2012 |

OTHER PUBLICATIONS

Search Report issued Nov. 18, 2016 in EP Application No. 147727861.

* cited by examiner

HYDROCARBON-PRODUCING APPARATUS AND HYDROCARBON-PRODUCING METHOD

CROSS-REFERENCE TO RELATED APPLICATION

This application is a Section 371 of International Application No. PCT/JP2014/057562, filed Mar. 19, 2014, which was published in the Japanese language on Oct. 2, 2014, under International Publication No. WO 2014/156893 A1, the disclosure of which is incorporated herein by reference.

FIELD OF THE INVENTION

The present invention relates to a hydrocarbon-producing apparatus that utilizes the Fischer-Tropsch synthesis reaction using a bubble column slurry bed reactor, and a hydrocarbon-producing method.

Priority is claimed on Japanese Patent Application No. 2013-073223, filed Mar. 29, 2013, the content of which is incorporated herein by reference.

BACKGROUND ART OF THE INVENTION

In recent years, clean liquid fuels, which have low sulfur and aromatic hydrocarbon content and are environmentally friendly, are required from an environmental viewpoint. From such a viewpoint, a method of using the Fischer-Tropsch synthesis reaction (hereinafter referred to as "FT synthesis reaction") in which carbon monoxide gas (CO) and hydrogen gas ($H_2$) are source gases has been studied as a technique capable of producing fuel-oil base materials which do not contain sulfur or aromatic hydrocarbon components and are rich in aliphatic hydrocarbons, particularly, kerosene and gas oil base materials. In this method, natural gas is reformed to produce synthesis gas (mixed gas having CO and $H_2$ as main components), hydrocarbons having a broad carbon number distribution are synthesized by the FT synthesis reaction from this synthesis gas, and the obtained hydrocarbons are hydrotreated and are fractionally distilled to produce a liquid-fuel base material. This method is referred to as a GTL (Gas-to-Liquid) technique (for example, refer to Patent Document 1).

Additionally, as a method of producing hydrocarbons by the FT synthesis reaction, a method is known using a bubble column slurry bed reactor in which blows synthesis gas into a slurry having solid catalyst particles suspended in liquid hydrocarbons (hereinafter simply referred to as "slurry") to perform the FT synthesis reaction (for example, refer to Patent Document 2).

In the method using this bubble column slurry bed reactor, a gaseous phase portion is formed at an upper portion of the slurry within this reactor, and the synthesis gas (unreacted synthesis gas), which is unreacted while passing through the inside of the slurry, and light hydrocarbons, which are produced by the FT synthesis reaction and are gases under conditions within the reactor, are discharged from a conduit connected to an upper portion of the reactor.

In such a bubble column slurry bed reactor, typically, in order to separate and recover liquid light oil from the light hydrocarbons discharged from the conduit connected to the upper portion of the reactor, the conduit is connected to a vapor-liquid separator, a gas discharge component from the upper portion of the reactor is cooled by a cooler of the vapor-liquid separator, and condensed light hydrocarbons are separated from a gas component by a vapor-liquid separation tank. Then, the gas component including the separated unreacted synthesis gas is recycled to the reactor, and the separated liquid component (light oil) is provided to a distillation process at a subsequent stage together with heavy oil to be described below.

Here, although the heavy oil produced by the FT synthesis reaction is basically discharged as a liquid from a slurry bed of the reactor, the heavy oil has slight vapor pressure under conditions within the reactor. Therefore, a portion of the heavy oil is present as gas in the gaseous phase portion and is discharged from the conduit as a portion of the aforementioned gas discharge component. Moreover, it is also considered that liquid heavy oil is entrained in the gas discharged as droplets and is included in the discharge component.

Incidentally, in the aforementioned bubble column slurry bed reactor, for example, in a start-up stage where supply of the synthesis gas (source gas) is started from an operation stop state or when the FT synthesis reaction needs to be temporarily stopped due to a particular situation, the operation of stopping the supply of the source gas, circulating nitrogen gas into a reaction system, and maintaining a flow of the slurry, though a reaction stops, may be performed. Additionally, for example, in a midway stage shifting from such an operation to a normal operation, the operation of supplying the source gas, but setting the reaction temperature to a temperature lower than that in the normal operation thereby keeping the FT synthesis reaction from proceeding substantially or performing operation in the reaction conversion rate of carbon monoxide gas markedly lower than that of the normal operation may also be performed.

In such an unsteady operation, a tendency in which cooling efficiency declines and the temperature of an outlet of a cooler rises may be seen in the cooler for cooling the gas discharge component discharged from the gaseous phase portion of the bubble column slurry bed reactor to liquefy a portion of the gas discharge component. This is because the heavy oil, which vaporizes from the liquid hydrocarbons constituting the slurry contained in the bubble column slurry bed reactor and becomes a portion of the gas discharge component, is cooled in the cooler and is deposited on and adheres to a line of the cooler as a solid (wax). In addition, there is also a possibility that problems may occur such that continuation of the operation of an FT synthesis unit becomes difficult due to a rise in the outlet temperature of the cooler or the line of the cooler is blocked in extreme cases.

As a countermeasure against problems resulting from the adhesion of the wax in such a cooler, for example, a method of melting and removing the adhered wax with steam in a stage where the cooling efficiency of the cooler has declined to a predetermined level is also considered. However, since the operation of the vapor-liquid separator is temporarily stopped in that case, the operation rate of the FT synthesis unit will decline. Additionally, although a configuration in which a plurality of vapor-liquid separators are installed in parallel so as not to stop the operation of the vapor-liquid separators is also considered, enlargement of a facility and an increase in facility costs will be caused in that case.

The present applicant has previously suggested a hydrocarbon-producing apparatus and a hydrocarbon-producing method that prevents wax from being adhered to a cooler of a vapor-liquid separator under such a background (refer to Patent Document 3).

In the hydrocarbon-producing apparatus and hydrocarbon-producing method, a supply line for a light component of light oil, which supplies the light component of the light oil within a downstream line to an upstream line, is provided between the downstream line that is located on the downstream side of a vapor-liquid separation unit at the last stage of a vapor-liquid separator and that allows the light component of the light oil whose cloud point is lower than the outlet temperature of a cooler in the vapor-liquid separation unit at the last stage to flow therethrough, and the upstream line that is located on the upstream side of the vapor-liquid separation unit at the last stage of the vapor-liquid separator, whereby wax is prevented from being adhered to the cooler of the vapor-liquid separation unit at the last stage of the vapor-liquid separator.

PRIOR ART DOCUMENT

Patent Documents

Patent Document 1: Japanese Unexamined Patent Application, First Publication No. 2004-323626
Patent Document 2: Published Japanese Translation No. 2007-516065 of the PCT International Publication
Patent Document 3: Japanese Unexamined Patent Application, First Publication No. 2012-193302

SUMMARY OF INVENTION

Technical Problem

A constant effect of preventing the adhesion of the wax to the cooler is obtained by the technique disclosed in the aforementioned Patent Document 3. However, in this technique, for example when a line connected to the vapor-liquid separation unit at the last stage of the vapor-liquid separator is used as a supply line for the light component of the light oil and the light component of the light oil is returned (supplied) to a line located so as to be directly connected with the vapor-liquid separation unit at the last stage of the vapor-liquid separator, especially if a prolonged standby operation is performed, a wax component is condensed in the light component of the light oil recycled from the supply line for the light component of the light oil and the adhesion of the wax cannot be reliably prevented. Therefore, there is a concern that the wax will adhere to the cooler of the vapor-liquid separation unit at the last stage and will be accumulated therein.

Accordingly, it is desired to provide a hydrocarbon-producing apparatus and a hydrocarbon-producing method that are capable of more reliably preventing the adhesion of the wax to the cooler.

The invention has been made in view of the aforementioned situation, and an object thereof is to provide a hydrocarbon producing apparatus and a hydrocarbon-producing method that are capable of reliably preventing problems that are caused as wax adheres to a cooler of a vapor-liquid separator for cooling a gas discharge component discharged from a gaseous phase portion of a reactor and liquefying a portion of the gas discharge component to recover a liquid component, in an unsteady operation when hydrocarbons are produced by the FT synthesis reaction using a bubble column slurry bed reactor.

Solution to Problem

The hydrocarbon-producing apparatus of the invention is a hydrocarbon-producing apparatus for producing hydrocarbons by a Fischer-Tropsch synthesis reaction. The hydrocarbon-producing apparatus includes a bubble column slurry bed reactor configured to hold a slurry including catalyst particles and liquid hydrocarbons therein; and a vapor-liquid separator having a plurality of vapor-liquid separation units each including a cooler and a vapor-liquid separation tank, which is configured to cool hydrocarbons, which are extracted from a gaseous phase portion at an upper portion of the slurry within the reactor and are gaseous under conditions within the reactor, using the cooler, and which is configured to liquefy a portion of the hydrocarbons in the vapor-liquid separation tank to perform vapor-liquid separation. A first vapor-liquid separation unit is positioned at the last stage in the vapor-liquid separator, and a middle portion within a vapor-liquid separation tank of a second vapor-liquid separation unit arranged on the upstream side of the first vapor-liquid separation unit is provided with a filling material layer. The vapor-liquid separation tank of the first vapor-liquid separation unit is provided with a first return line, and the vapor-liquid separation tank of the second vapor-liquid separation unit is provided with a second return line. In the first vapor-liquid separation unit, a light component of light oil discharged from a bottom of the vapor-liquid separation tank is returned to a portion between a top side above a return-location from the second return line within the vapor-liquid separation tank of the second vapor-liquid separation unit, and a line directly connected with the cooler of the first vapor-liquid separation unit, through the first return line. In the second vapor-liquid separation unit where a cooling temperature caused by the cooler is set to 80° C. to 120° C., a heavy component of light oil discharged from a bottom of the vapor-liquid separation tank of the second vapor-liquid separation unit is returned to the filling material layer of the vapor-liquid separation tank of the second vapor-liquid separation unit or a top side above the filling material layer through the second return line.

In the hydrocarbon-producing apparatus, the first return line may be installed so as to connect the bottom of the vapor-liquid separation tank of the first vapor-liquid separation unit, and the top side above the filling material layer within the vapor-liquid separation tank of the second vapor-liquid separation unit.

In the hydrocarbon-producing apparatus, the second return line may be provided with a pump configured to transfer the heavy component of the light oil, and a cooler within the second return line located on the downstream side of the pump, and the cooler within the second return line may be configured to cool the heavy component of the light oil sent from the pump to a target temperature of 80° C. or higher, wherein the target temperature is equal to or lower than a predetermined temperature caused by the cooler of the second vapor-liquid separation unit.

The hydrocarbon-producing method of the invention is a hydrocarbon-producing method for producing hydrocarbons by a Fischer-Tropsch synthesis reaction using the hydrocarbon-producing apparatus. The hydrocarbon-producing method includes a vapor-liquid separation step of cooling hydrocarbons, which are extracted from a gaseous phase portion on the slurry within the reactor and are gaseous under conditions within the reactor, and liquefying a portion of the hydrocarbons in the vapor-liquid separation tank to perform vapor-liquid separation. While the reaction is stopped in the reactor or while the reaction progresses in which a carbon monoxide reaction conversion rate is 20% or less in the reactor, in the first vapor-liquid separation unit, a light component of light oil discharged from a bottom of the vapor-liquid separation tank is returned to a portion between a top side above a return-location from the second return line within the vapor-liquid separation tank of the second vapor-liquid separation unit, and a line directly connected with the cooler of the first vapor-liquid separation unit. In the second vapor-liquid separation unit where a cooling temperature caused by the cooler is set to 80° C. to 120° C., a heavy component of light oil discharged from a bottom of the vapor-liquid separation tank of the second vapor-liquid separation unit is returned to the filling material layer of the vapor-liquid separation tank of the second vapor-liquid separation unit or a top side above the filling material layer.

In the hydrocarbon-producing method, in the first vapor-liquid separation unit, the light component of the light oil discharged from the bottom of the vapor-liquid separation tank may be returned to the top side above the filling material layer in the vapor-liquid separation tank of the second vapor-liquid separation unit through the first return line.

In the hydrocarbon-producing method, the second return line may be provided with a pump for transferring the heavy component of the light oil and may be provided with a cooler within the second return line located on the downstream side of the pump. In the cooler within the second return line, the heavy component of the light oil sent from the pump is cooled to a temperature of 80° C. or higher, wherein the target temperature is equal to or lower than a predetermined temperature caused by the cooler of the second vapor-liquid separation unit.

Advantageous Effects of the Invention

According to the hydrocarbon-producing apparatus of the invention, the middle portion within the vapor-liquid separation tank of the second vapor-liquid separation unit where the cooling temperature is set to 80° C. to 120° C. by the cooler is provided with the filling material layer, and the vapor-liquid separation tank of the second vapor-liquid separation unit is provided with the second return line that returns the heavy component of the light oil discharged from the bottom of the vapor-liquid separation tank to the inside of the filling material layer of the vapor-liquid separation tank of the second vapor-liquid separation unit or the top side above the filling material layer. Thus, vapor, droplets, or the like of the heavy components in the introduced hydrocarbons can be made to be absorbed well in the heavy component of the light oil by bringing the gas component in the hydrocarbons introduced into the vapor-liquid separation tank of the second vapor-liquid separation unit and the heavy component of the light oil returned to the inside of the filling material layer of the vapor-liquid separation tank or the top side above the filling material layer into vapor-liquid contact with each other in the filling material layer.

This can prevent the heavy component, which is a wax component in the hydrocarbons, from flowing from the top of the vapor-liquid separation tank to the first vapor-liquid separation unit side at the last stage as vapor, droplets, or the like.

Additionally, since the vapor-liquid separation tank of the first vapor-liquid separation unit is provided with the first return line that returns the light component of the light oil discharged from the bottom of the vapor-liquid separation tank to a portion between the top side above the return-location from the second return line within the vapor-liquid separation tank of the second vapor-liquid separation unit and the line directly connected with the cooler at the last stage in the cooler of the first vapor-liquid separation unit, the light component of the light oil can be supplied to the upstream side of the line directly connected with the cooler at the last stage, whereby wax can be prevented from being adhered to the cooler at the last stage in the first vapor-liquid separation unit or the adhered wax can be removed.

Moreover, even when a prolonged standby operation is performed, the second return line is provided to thereby keep the heavy component, which is the wax component, from being included in the hydrocarbons that flow out of the top of the second vapor-liquid separation tank and prevent the heavy component, which is the wax component, from flowing to the first vapor-liquid separation unit side at the last stage. Thus, the wax component can be prevented from being condensed in the light component of the light oil that flows and circulates through the first return line.

Hence, occurrence of problems accompanying adhesion of wax can be more reliably prevented without causing a decline in the operation rate of the FT synthesis unit, enlargement of facilities, and an increase in facility costs.

Additionally, according to the hydrocarbon-producing method of the invention, while the FT synthesis reaction stops or while the carbon monoxide reaction conversion rate is 20% or less, in the second vapor-liquid separation unit, the heavy component of the light oil discharged from the bottom of the vapor-liquid separation tank of the second vapor-liquid separation unit is returned to the filling material layer of the vapor-liquid separation tank of the second vapor-liquid separation unit or the top side above the filling material layer by the second return line. Thus, vapor, droplets, or the like of the heavy component in the introduced hydrocarbons can be made to be absorbed well in the heavy component of the light oil by bringing the gas component in the hydrocarbons introduced into the vapor-liquid separation tank of the second vapor-liquid separation unit and the heavy component of the light oil returned to the inside of the filling material layer of the vapor-liquid separation tank or the top side above the filling material layer into vapor-liquid contact with each other in the filling material layer. This can prevent the heavy component, which is a wax component in the hydrocarbons, from flowing out of the top of the vapor-liquid separation tank as vapor, droplets, or the like, and flowing to the first vapor-liquid separation unit side at the last stage.

Additionally, in the first vapor-liquid separation unit, the light component of the light oil discharged from the bottom of the vapor-liquid separation tank is returned to a portion between the top side above the return-location from the second return line within the vapor-liquid separation tank of the second vapor-liquid separation unit and the line directly connected with the cooler at the last stage in the cooler of the first vapor-liquid separation unit by the first return line. Thus, the light component of the light oil can be supplied to the upstream side of the line directly connected with the cooler at the last stage, whereby wax can be prevented from adhering to the cooler at the last stage in the first vapor-liquid separation unit and the adhered wax can be removed.

Moreover, even when a prolonged standby operation is performed, the heavy component of the light oil is returned to the inside of the filling material layer by the second return line, and the heavy component, which is the wax component, is kept from being included in the hydrocarbons that flow out of the top of the second vapor-liquid separation tank to prevent the heavy component, which is the wax component, from flowing to the first vapor-liquid separation unit side at the last stage. Thus, the wax component can be prevented from being condensed in the light component of the light oil that flows and circulates through the first return line.

Hence, occurrence of problems accompanying adhesion of wax can be more reliably prevented without causing a decline in the operation rate of the FT synthesis unit, enlargement of facilities, and an increase in facility costs.

DETAILED DESCRIPTION OF THE INVENTION

Hereinafter, a hydrocarbon-producing apparatus and a hydrocarbon-producing method of the invention will be described in detail.

First, a liquid fuel-synthesizing system including an embodiment of the hydrocarbon-producing apparatus of the invention will be described with reference to FIG. 1.

Figure 1:
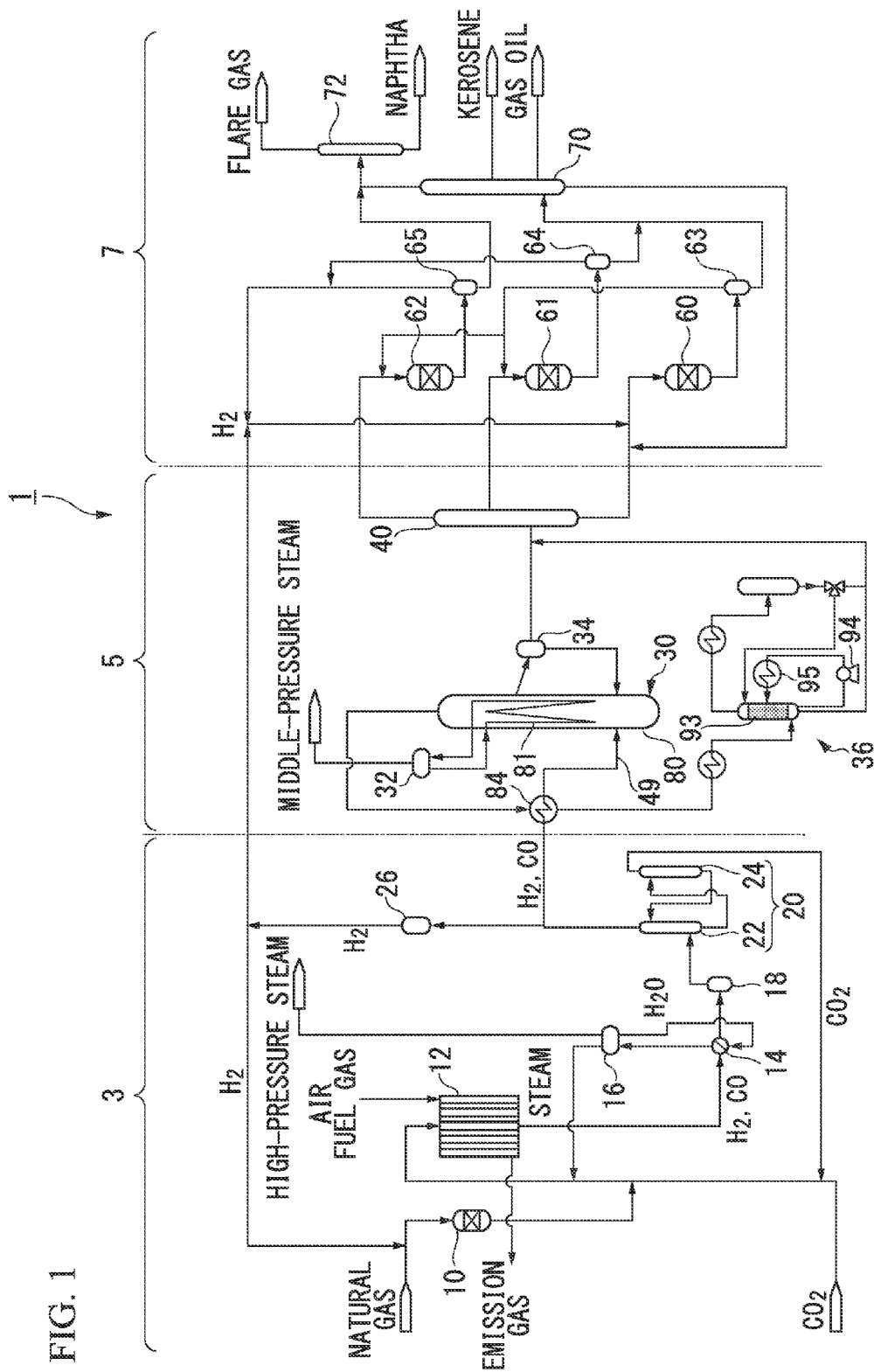
FIG. 1 is a schematic view showing an overall configuration of an example of a liquid fuel-synthesizing system related to the invention.

A liquid fuel-synthesizing system 1 shown in FIG. 1 is a plant facility that executes the GTL process that converts a hydrocarbon feedstock, such as natural gas, into liquid fuel.

The liquid fuel-synthesizing system 1 includes a synthesis gas production unit 3, an FT synthesis unit 5, and an upgrading unit 7. The synthesis gas production unit 3 is configured to, reform natural gas, which is hydrocarbon feedstock, to produce synthesis gas including carbon monoxide gas and hydrogen gas. The FT synthesis unit 5 is configured to synthesize liquid hydrocarbons by the FT synthesis reaction from the synthesis gas produced in the synthesis gas production unit 3. The upgrading unit 7 is configured to hydrotreat the liquid hydrocarbons synthesized by the FT synthesis reaction to produce base materials of liquid fuel (mainly kerosene and gas oil).

Hereinafter, constituent elements of these respective units will be described.

The synthesis gas production unit 3 mainly includes, for example, a desulfurization reactor 10, a reformer 12, a waste heat boiler 14, vapor-liquid separators 16 and 18, a $CO_2$ removal unit 20, and a hydrogen separator 26. The desulfurization reactor 10 is composed by a hydrodesulfurizer or the like, and removes a sulfur compound from natural gas as a feedstock. The reformer 12 reforms the natural gas supplied from the desulfurization reactor 10, to produce synthesis gas including carbon monoxide gas (CO) and hydrogen gas ($H_2$) as main components. The waste heat boiler 14 recovers waste heat of the synthesis gas produced by the reformer 12, to generate high-pressure steam.

The vapor-liquid separator 16 separates the water heated by heat exchange with the synthesis gas in the waste heat boiler 14 into gas (high-pressure steam) and liquid. The vapor-liquid separator 18 removes a condensed component from the synthesis gas cooled in the waste heat boiler 14, and supplies a gas component to the $CO_2$ removal unit 20. The $CO_2$ removal unit 20 has an absorption tower 22 that removes carbon dioxide gas by using an absorbent from the synthesis gas supplied from the vapor-liquid separator 18, and a regeneration tower 24 that strips the carbon dioxide gas from the absorbent including the carbon dioxide gas to regenerate the absorbent. The hydrogen separator 26 separates a portion of the hydrogen gas included in the synthesis gas, from the synthesis gas of which the carbon dioxide gas has been separated by the $CO_2$ removal unit 20. It is to be noted herein that the $CO_2$ removal unit 20 need not be provided depending on circumstances.

Among them, the reformer 12 reforms natural gas by using carbon dioxide gas and steam to produce high-temperature synthesis gas including carbon monoxide gas and hydrogen gas as main components, for example, by a steam and carbon-dioxide-gas reforming method expressed by the following chemical reaction formulas (1) and (2). In addition, the reforming method in the reformer 12 is not limited to the example of the steam and carbon-dioxide-gas reforming method. For example, a steam reforming method, a partial oxidation reforming method (PDX) using oxygen, an auto-thermal reforming method (ATR) that is a combination of the partial oxidation reforming method and the steam reforming method, carbon-dioxide-gas reforming method, and the like can also be utilized.

$$CH_4 + H_2O \rightarrow CO + 3H_2 \qquad (1)$$

$$CH_4 + CO_2 \rightarrow 2CO + 2H_2 \qquad (2)$$

Additionally, the hydrogen separator 26 is provided on a branch line branching from a main line that connects the $CO_2$ removal unit 20 or the vapor-liquid separator 18 with a bubble column slurry bed reactor 30. The hydrogen separator 26 can be composed by, for example, a hydrogen pressure swing adsorption (PSA) device that performs adsorption and desorption of hydrogen by using a pressure difference. The hydrogen PSA device has adsorbents (zeolitic adsorbent, activated carbon, alumina, silica gel, or the like) within a plurality of adsorption towers (not shown) that are arranged in parallel. By sequentially repeating respective processes including pressurizing, adsorption, desorption (pressure reduction), and purging of hydrogen in each of the adsorption towers, high-purity (for example, about 99.999%) hydrogen gas separated from the synthesis gas can be continuously supplied to various hydrogen-utilizing reaction devices (for example, the desulfurization reactor 10, a wax fraction-hydrocracking reactor 60, a middle distillate-hydrotreating reactor 61, and a naphtha fraction-hydrotreating reactor 62, and the like) that perform predetermined reactions by utilizing hydrogen.

The hydrogen gas-separating method in the hydrogen separator 26 is not limited to the example of the pressure swing adsorption method as in the aforementioned hydrogen PSA device. For example, there may be a hydrogen storing alloy adsorption method, a membrane separation method, or a combination thereof.

Figure 2:
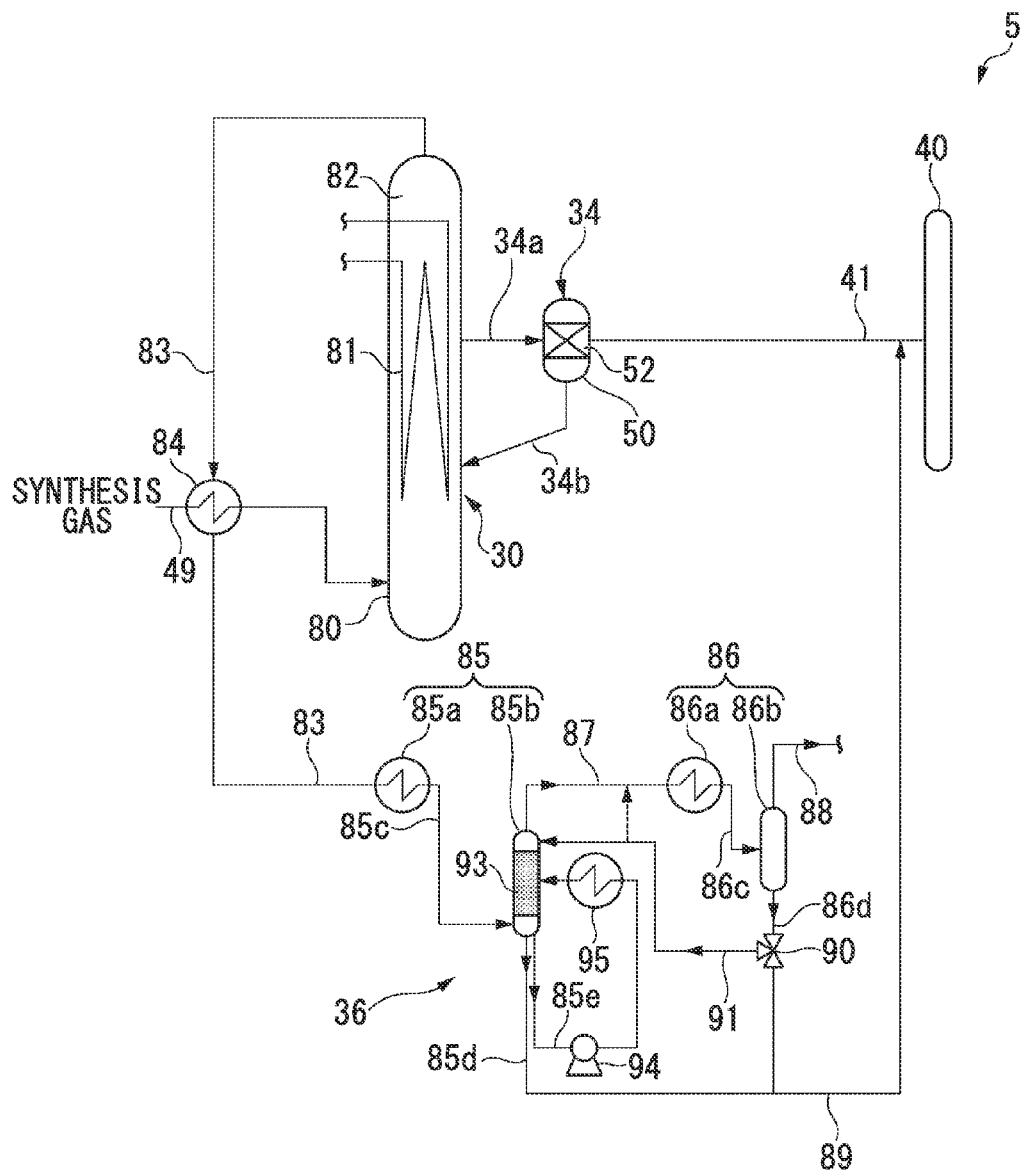
FIG. 2 is a schematic configuration view of an FT synthesis unit related to the invention.

Next, the FT synthesis unit 5 will be described with reference to FIGS. 1 and 2. As shown in FIG. 1 and FIG. 2, the FT synthesis unit 5 mainly includes the bubble column slurry bed reactor 30 (hereinafter referred to as a "reactor 30"), a vapor-liquid separator 32, an external catalyst separator 34, a vapor-liquid separator 36, and a first fractionator 40.

The reactor 30, in which liquid hydrocarbons are synthesized from synthesis gas, functions as an FT synthesis reactor in which liquid hydrocarbons are synthesized from synthesis gas by the FT synthesis reaction. The reactor 30 mainly includes a reactor body 80 and a cooling line 81, and is operated under the conditions that the internal temperature thereof is about 180° C. to 270° C. and the interior thereof is pressurized from the atmospheric pressure.

The reactor body 80 is a substantially cylindrical metallic vessel. A slurry having solid catalyst particles suspended in liquid hydrocarbons (product synthesized by the FT synthesis reaction) is held inside the reactor body 80, and forms a slurry bed.

In a lower portion of the reactor body 80, the synthesis gas including hydrogen gas and carbon monoxide gas as main components is injected into the slurry. Then, the synthesis gas blown into the slurry as bubbles ascends upward from below in the height direction (vertical direction) of the reactor body 80 through the slurry. In such a process, the synthesis gas is dissolved in the liquid hydrocarbons and brought into contact with the catalyst particles, whereby a synthesis reaction (FT synthesis reaction) of the liquid hydrocarbons proceeds. Specifically, as shown in the following chemical reaction formula (3), the hydrogen gas and the carbon monoxide gas react with each other to produce hydrocarbons.

$$2nH_2 + nCO \rightarrow (-CH_2-)_n + nH_2O \qquad (3)$$

Here, in such a reaction, the ratio of the carbon monoxide gas consumed within the reactor to the carbon monoxide gas (CO) supplied to the reactor is referred to as a reaction conversion rate (hereinafter simply referred to as "reaction conversion rate") of carbon monoxide in the present application. This reaction conversion rate is calculated in terms of percentage from the molar flow rate (inlet CO molar flow rate) of carbon monoxide gas in the gas that flows into the reactor body 80 per unit time, and the molar flow rate (outlet CO molar flow rate) of carbon monoxide gas in a gas discharge component extracted per unit time from a gaseous phase portion 82 of the reactor body 80 as will be described below. That is, the reaction conversion rate is obtained by the following formula (4).

$$\text{Reaction conversion rate} = \frac{\text{Inlet CO molar flow rate} - \text{Outlet CO molar flow rate}}{\text{Inlet CO molar flow rate}} \times 100 \qquad (4)$$

In addition, in order to reuse the synthesis gas that is included in the gas discharge component discharged from the gaseous phase portion of the reactor 30 and is unreacted within the reactor body 80, a gas component, which is separated from a liquid component condensed by cooling the gas discharge component, is commonly recycled to the reactor body 80 and is provided for a reaction again. In that case, the inlet CO molar flow rate means the molar flow rate of carbon monoxide gas in a reactor inlet gas including the newly supplied synthesis gas and the recycled gas.

The molar flow rate (inlet CO molar flow rate) of the carbon monoxide gas in the synthesis gas that flows into the reactor body 80 per unit time is continuously or periodically measured by, for example, a gas chromatography device and a flow meter (not shown) that are provided at a supply line 49 through which the synthesis gas is supplied to the reactor body 80. In addition, as mentioned above, when the gas including the unreacted synthesis gas is recycled to the reactor body 80, it is preferable that positions where the gas chromatography device and the flow meter are installed on the supply line 49 be located further toward the downstream side than a junction with a line through which the recycled gas flows. Additionally, the molar flow rate (outlet CO molar flow rate) of the carbon monoxide gas in the discharge component extracted per unit time from the gaseous phase portion 82 of the reactor body 80 is continuously or periodically measured by the gas chromatography device and the flow meter (not shown) that are provided at a discharging line 88 to be described below. Accordingly, the reaction conversion rate of the carbon monoxide is continuously or periodically calculated on the basis of the formula (4) from such measured values, and operation is monitored according to this calculation result.

In the reactor body 80, as the synthesis gas ascends within the reactor body 80 as bubbles, an upward flow (gas lift) of the slurry occurs inside the reactor body 80. As a result, a circulatory flow of the slurry is generated inside the reactor body 80.

In addition, the gaseous phase portion 82 is provided at an upper portion of the slurry held within the reactor body 80, and vapor-liquid separation is performed at an interface between this gaseous phase portion 82 and the slurry. That is, the synthesis gas, which has passed through the interface between the slurry and the gaseous phase portion 82 without reacting in the slurry, and the hydrocarbons, which are produced by the FT synthesis reaction and are gaseous and relatively light under conditions within the reactor body 80, move to the gaseous phase portion 82 as a gas component. At this time, most of the droplets (bubbles) entrained in the gas component and the catalyst particles entrained in the droplets are returned to the slurry due to gravity. Then, the gas components (the unreacted synthesis gas and the light hydrocarbons) that have ascended to the gaseous phase portion 82 of the reactor body 80 are extracted via a conduit (extraction line 83) connected to the gaseous phase portion 82 (column top) of the reactor body 80, and become the gas discharge component. The gas discharge component is then supplied to the vapor-liquid separator 36 after being cooled as will be described below.

The cooling line 81 is provided inside the reactor body 80 to remove the reaction heat generated by the FT synthesis reaction thereby maintaining the temperature within the system at a predetermined temperature. This cooling line 81 may be formed, for example, so that one pipe is bent and goes back and forth multiple times up and down along the vertical direction. Additionally, for example, a plurality of cooling lines of the double tube structure referred to a bayonet type may be arranged inside the reactor body 80. That is, the shape and the number of the cooling lines 81 is not limited to the aforementioned shape and number, and arbitrary shapes and numbers of cooling lines can be adopted so long as the cooling lines are arranged inside the reactor body 80 and can contribute to cooling the slurry.

In this cooling line 81, cooling water (for example, water whose difference from the temperature within the reactor body 80 is about −50° C. to 0° C.) supplied from the vapor-liquid separator 32 shown in FIG. 1 flows. As heat exchange is performed with the slurry via the wall of the cooling line 81 while the cooling water flows through the cooling line 81, the slurry inside the reactor body 80 is cooled. A portion of the cooling water becomes steam, is discharged to the vapor-liquid separator 32, and then is recovered as middle-pressure steam.

A medium for cooling the slurry within the reactor body 30 is not limited to the cooling water as mentioned above. For example, straight-chain, branched-chain, and annular alkanes of $C_4$ to $C_{10}$, olefin, low-molecular-weight silane, silyl ether, silicon oil, or the like can be used.

The vapor-liquid separator 32 separates the water flowing and heated through the cooling line 81 disposed within the reactor 30 into steam (middle-pressure steam) and liquid. The liquid separated in the vapor-liquid separator 32 is supplied again to the cooling line 81 as the cooling water as mentioned above.

Although the catalyst that is included in the slurry held within the reactor body 80 is not particularly limited, a solid particulate catalyst in which at least one kind of active metal selected from cobalt, ruthenium, iron, and the like is supported on a catalyst support made of inorganic oxides, such as silica or alumina, is preferably used. This catalyst may further have a metal component, such as zirconium, titanium, hafnium, or rhenium, which is added for enhancing the activity of the catalyst, other than the active metal. Although the shape of the catalyst is not particularly limited, the shape of the catalyst is preferably a substantially spherical shape from a viewpoint of the flowability of the slurry and from a viewpoint of suppressing the decay and wearing away of the catalyst particles and pulverized catalyst particles are generated, clue to collision or friction between the catalyst particles or between the catalyst particles and the inner wall of the reactor body 80, the cooling line 81, or the like during flow.

Additionally, although the average particle diameter of the catalyst particles is not particularly limited, it is preferable from a viewpoint of the flowability of the slurry that the average particle diameter be about 40 µm to 150 µm.

The external catalyst separator 34, as shown in FIG. 2, includes a separation tank 50 disposed outside the reactor 30, and a filter 52 provided within the separation tank 50. The filter 52 is provided to trap the catalyst particles so as to separate the catalyst particles from the liquid hydrocarbons included in the slurry, and the filter(s) 52 is(are) installed in a single stage or multiple stages in a flow direction of the slurry. It is desirable that the aperture of the filter (the filter having the smallest aperture when filters are installed in multiple stages) be 5 µm to 30 µm, preferably 5 µm to 20 µm, and still more preferably 5 µm to 15 µm. Additionally, an outflow line 34a connected to a middle portion of the reactor body 80 is provided at the upper portion of the separation tank 50, and a return line 34b connected to the lower portion of the reactor body 80 is provided at a lower portion of the separation tank 50.

Here, the lower portion of the reactor body 80 is a portion that is within a range of ⅓ or less of the length of the reactor body 80 from the bottom of the reactor body 80, and the middle portion of the reactor body 80 is a portion between the upper portion and the lower portion of the reactor body 80. The outflow line 34a is a line for supplying a portion of the slurry within the reactor body 80 to the external catalyst separator 34, and the return line 34b is a line for returning the hydrocarbon oil and the catalyst particles, which are trapped by the filter 52, to the reactor body 80.

Additionally, a line 41 is connected to the filter 52 within the separation tank 50 and leads out the heavy oil which is separated from the catalyst, particles. Additionally, a filtering device (not shown) and a storage tank (not shown) are disposed in this order at the line 41 if necessary. The filtering device has a filter (not shown) therein and filtrates the introduced liquid hydrocarbons using this filter. That is, the filter of the filtering device traps and removes at least a portion of the catalyst particles that become fine powder included in the liquid hydrocarbons that have flowed out without being trapped by the filter 52. The storage tank temporarily stores the liquid hydrocarbons that are filtrated by the filter 52 and are further filtrated again by the filtering device. Then, the first fractionator 40 is further connected to the downstream side of the line 41 at which such a filtering device (not shown) and the storage tank (not shown) are disposed if necessary.

Additionally, the extraction line 83 is connected to the gaseous phase portion 82 (column top) of the reactor body 80 at the reactor 30. The extraction line 83 is connected to the vapor-liquid separator 36 via a heat exchange section 84, and transfers the gas component in the gaseous phase portion 82, which has ascended to the top of the reactor body 80, to the vapor-liquid separator 36 as the gas discharge component. The heat exchange section 84 causes the synthesis gas supplied from the synthesis gas production unit 3 and the gas discharge component extracted from the reactor body 80 to perform heat exchange with each other, heats the synthesis gas with a relatively low temperature, and cools the gas discharge component with a relatively high temperature.

The vapor-liquid separator 36 includes a second vapor-liquid separation unit 85 and a first vapor-liquid separation unit 86 in the present embodiment, the second vapor-liquid separation unit 85 is arranged on the upstream side to constitute a previous stage, and the first vapor-liquid separation unit 86 constitute a subsequent stage that is arranged on the downstream side. That is, in the present embodiment, the first vapor-liquid separation unit 86 is a vapor-liquid separation unit at the last stage of the vapor-liquid separator 36. In addition, the vapor-liquid separator 36 of the invention is not limited to the two-stage configuration, and may have three or more stages. As the vapor-liquid separator 36 has a plural-stage configuration, a liquefiable component included in the gas discharge component can be more reliably liquefied and recovered.

The second vapor-liquid separation unit 85 includes a second cooler 85a and a second vapor-liquid separation tank 85b arranged on the downstream side thereof, and the first vapor-liquid separation unit 86 includes a first cooler 86a and a first vapor-liquid separation tank 86b arranged on the downstream side thereof. The second cooler 85a of the second vapor-liquid separation unit 85 is directly connected to the extraction line 83, causes the discharge component cooled through the heat exchange section 84 to perform heat exchange with a cooling medium, such as water, to further cool the discharge component, and thereby liquefies a portion of the discharge component. The second cooler 85a is configured so as to further cool the discharge component cooled to, for example, about 180° C. through the heat exchange section 84, to thereby set the temperature of the discharge component at an outlet thereof to 80° C. or higher and 120° C. or lower, and preferably 100° C. or higher and 120° C. or lower. In the present embodiment, the second cooler is configured so as to set the temperature of the discharge component at the outlet thereof to about 110° C.

Here, since a wax component slightly included in the discharge component solidifies (coagulates) at about 100° C., it is considered that the wax component solidifies when being cooled to, for example, about 80° C. by the second cooler 85a of the second vapor-liquid separation unit 85. However, the wax component is only slightly included in the discharge component, and accordingly, even if the wax component solidifies, this solidified component is dissolved or dispersed in the discharge component. Therefore, the flowability of the overall discharge component will not be lost. Therefore, the wax component does not adhere to the second cooler 85a, and the discharge component including the wax component flows into the second vapor-liquid separation tank 85b arranged on the downstream side of the second cooler 85a.

The second vapor-liquid separation tank 85b is connected to an outlet of the second cooler 85a via a second line 85c, and is configured so as to separate the liquid hydrocarbons of which the boiling point exceeds about 110° C. from the gas component of which the boiling point is lower than about 110° C. and discharge this gas component toward the first vapor-liquid separation unit 86 side. A filling material such as a packing material, a raschig ring or the like is arranged at a middle portion in the height direction within the second vapor-liquid separation tank 85b. The filling material is arranged in layers in the height direction of the second vapor-liquid separation tank 85b to form a filling material layer 93. Here, the second line 85c is connected to a bottom side (lower side) of the second vapor-liquid separation tank 85b below the filling material layer 93. Accordingly, a discharge component that has flowed out of the second cooler 85a flows into the bottom side of the second vapor-liquid separation tank 85b below the filling material layer 93.

A second discharging line 85d through which a heavy component of light oil separated from the gas component is led out is connected to the bottom of the second vapor-liquid separation tank 85b. Additionally, separately from this, a second return line 85e is connected to the bottom of the second vapor-liquid separation tank 85b. The second return line 85e is configured so that the heavy component of the light oil discharged from the second vapor-liquid separation tank 85b is returned to the inside of the filling material layer 93 of the second vapor-liquid separation tank 85b or the top side of the second vapor-liquid separation tank 85b above the filling material layer 93. That is, the second return line 85e has one end (terminal) connected to the inside of the filling material layer 93 or to the top side above the filling material layer 93, and thereby, the heavy component of the light oil discharged from the second vapor-liquid separation tank 85b is adapted to flow to the inside of the filling material layer 93 or to the top side above the filling material layer 93 (In FIGS. 1 and 2, although one end (terminal) of the second return line 85e is connected to the inside of the filling material layer 93, the second return line may be connected to the top side above the filling material layer 93).

Here, the second return line 85e is provided with a pump 94 for transferring (pumping) the heavy component of the light oil discharged from the second vapor-liquid separation tank 85b, and a cooler 95 within the second return line. The cooler 95 within the second return line is arranged on the downstream side of the pump 94 in the second return line 85e, and is configured to cool the heavy component of the light oil pumped by the pump 94 to a target temperature of 80° C. or higher, however the target temperature is equal to or lower than a predetermined temperature (in the present embodiment, about 110° C. or lower) caused by the second cooler 85a.

That is, since the temperature of the heavy component of the light oil pumped by the pump 94 rises due to compression heat, the temperature of the heavy component tends to become higher than the temperature of the discharge component that flows into the second vapor-liquid separation tank 85b from the second cooler 85a. Accordingly, by cooling the heavy component of the pumped light oil to the cooling temperature or lower, which is caused by the second cooler 85a, by the cooler 95 within the second return line, the heavy component of the light oil returned to the second vapor-liquid separation tank 85b be prevented from vaporizing and thereby flowing to the first vapor-liquid separation unit 86 side. In addition, in the present embodiment, the cooling temperature caused by the cooler 95 within the second return line is about 100° C.

Thus, since the heavy component of the light oil is returned to the second vapor-liquid separation tank 85b and flows to the inside of the filling material layer 93 or to the top side above the filling material layer 93 by the second return line 85e, the gas component in the discharge component that has flowed in from the second line 85c and the heavy component of the light oil returned by the second return line 85e perform vapor-liquid contact mainly in the filling material layer 93 within the second vapor-liquid separation tank 85b. As a result, the wax component included (entrained) in the gas component as vapor, droplets, or the like is absorbed well in the heavy component of the returned light oil and is discharged from the bottom of the second vapor-liquid separation tank 85b.

A portion of the heavy component of the light oil discharged from the bottom of the second vapor-liquid separation tank 85b flows to a line 89 via the second discharging line 85d and further flows to the line 41. Additionally, the remainder of the heavy component of the light oil discharged from the bottom flows to the second return line 85e as mentioned above and is circulated to the second vapor-liquid separation tank 85b. The amounts of the heavy component of the light oil, which is discharged from the bottom and flows to the second discharging line 85d and flows to the second return line 85e, are appropriately set in advance and are controlled by a control valve (not shown) provided at the second, return line 85e. In addition, although the second return line 85e is directly connected to the bottom of the second vapor-liquid separation tank 85b in the present embodiment, the second return line may be connected to the second discharging line 85d via, for example, a three-way valve or the like. In that case, a portion of the second discharging line 85d and the second return line connected thereto becomes the second return line in the invention.

The first cooler 86a of the first vapor-liquid separation unit 86 is connected to the top of the second vapor-liquid separation tank 85b via a connection line 87, causes the gas component extracted from the second vapor-liquid separation tank 85b to perform heat exchange with a cooling medium, such as water, to further cool the gas component, and thereby liquefies a portion of the gas component. For example, the first cooler 86a is configured so as to further cool the gas component extracted from the second vapor-liquid separation tank 85b, to thereby set the temperature of the gas component at an outlet thereof to about 40° C. to 50° C. In the present embodiment, the first cooler 86a is configured so as to set the temperature of the gas component at the outlet to about 45° C. In addition, although the first cooler 86a is constituted by a single cooler in the present embodiment, the first cooler 86a may be constituted by a plurality of (for example, two) coolers. In that case, for example, it is preferable to configure the coolers so that the gas component is cooled to about 60° C. by a first cooler and is cooled to about 45° C. by a second (last) cooler.

The first vapor-liquid separation tank 86b is connected to an outlet of the first cooler 86a via a first line 86c, and is configured so as to separate the liquid hydrocarbons of which the boiling point exceeds about 45° C. from the gas component of which the boiling point is lower than 45° C., and discharge this gas component from the discharging line 88 provided at the top thereof.

The gas components discharged from the discharging line 88 mainly include unreacted synthesis gas (CO, $H_2$) and gaseous hydrocarbons of $C_4$ or less. Accordingly, in a normal operation, a portion or all of the gas components discharged from the first vapor-liquid separation tank 86b is returned to the synthesis gas supply line 49 by a recycle line (not shown) and is again provided for the FT synthesis reaction together with newly supplied synthesis gas.

Additionally, a portion or, according to circumferences, all of the gas components discharged from the discharging line 88, may be incinerated as flare gas or the like. In addition, a temperature sensor (not shown) is provided at the first line 86*c*, and the outlet temperature of the first cooler 86*a* is continuously monitored by this sensor.

A first discharging line 86*d* through which liquid hydrocarbons separated from the gas component are led out is connected to the bottom of the first vapor-liquid separation tank 86*b*. The first discharging line 86*d* is connected to one line 89 together with the second discharging line 85*d*, and the line 89 is connected to the line 41.

The first fractionator 40 is disposed so as to be connected to the line 41, heavy oil supplied through the line 41, that is, heavy oil discharged from the external catalyst separator 34, and liquid hydrocarbons supplied through the second discharging line 85*d* and the first discharging line 86*d*, and further the line 89, that is, a heavy component of light oil and a light component of light oil discharged from the second vapor-liquid separation tank 85*b* and the first vapor-liquid separation tank 86*b* are distilled and are separated into respective fractions according to boiling points.

Here, in the present embodiment, a switching valve 90 including a three-way valve or the like is provided at the first discharging line 86*d* that is a line on the downstream side of the first vapor-liquid separation unit 86 that is a vapor-liquid separation unit at the last stage of the vapor-liquid separator 36, and a first return line 91 is connected to this switching valve 90. The first return line 91 is connected to the top side above a return-location from the second return line 85*e* (second return line) within the second vapor-liquid separation tank 85*b* of the second vapor-liquid separation unit 85.

However, the invention is not limited to this, and the first return line 91, for example as shown by a dashed line in FIG. 2, may be connected to a line directly connected with the first cooler 86*a* of the first vapor-liquid separation unit 86, that is, the connection line 87. Additionally, when the first cooler 86*a* is constituted by a plurality of coolers, the first return line 91 may be connected to a line directly connected with a cooler at the last stage. That is, the first return line 91 is connected a portion between the top side above the return-location from the second return line 85*e* within the second vapor-liquid separation tank 85*b* of the second vapor-liquid separation unit 85 and the line directly connected with the cooler at the last stage in the coolers of the first vapor-liquid separation unit 86. As a result, the light component of the light oil that flows through the first discharging line 86*d* to be described below is recycled to the cooler at the last stage of the first vapor-liquid separation unit 86 that performs cooling to a lowest temperature.

By providing the first return line 91 with, for example, a pump (not shown), the light component of the light oil that flows through the first discharging line 86*d* is transferred (supplied) to the second vapor-liquid separation tank 85*b*. That is, the first return line 91 has a base end connected to the first discharging line 86*d* and has a terminal connected to the second vapor-liquid separation tank 85*b*.

Here, the light component of the light oil led out to the first discharging line 86*d* connected to the bottom of the first vapor-liquid separation tank 86*b* of the first vapor-liquid separation unit 86 (the vapor-liquid separation unit at the last stage of the vapor-liquid separator 36) is the liquid hydrocarbons condensed by the first cooler 86*a*, and is light hydrocarbons of which a cloud point (CP) specified in JIS K2269 is lower than the outlet temperature (about 45° C. in the normal operation) of the first cooler 86*a* in the first vapor-liquid separation unit 86.

The switching valve 90 is capable of performing switching in three ways including a mode where the total amount of the light component of the light oil discharged from the first vapor-liquid separation tank 86*b* is discharged to the line 89, a mode where the total amount is discharged to the first return line 91, and a mode where a portion is discharged to the line 89 and the remainder is discharged to the first return line 91. Additionally, in the mode where a portion of the light component of the light oil is discharged to the line 89 and the remainder is discharged to the first return line 91, the ratio of the amounts of the light component of the light oil discharged to the respective lines 89 and 91 can be appropriately changed.

As shown in FIG. 1, the upgrading unit 7, for example, includes a wax fraction-hydrocracking reactor 60, a middle distillate-hydrotreating reactor 61, a naphtha fraction-hydrotreating reactor 62, vapor-liquid separators 63, 64, and 65, a second fractionator 70, and a naphtha stabilizer 72. The wax fraction-hydrocracking reactor 60 is connected to the bottom of the first fractionator 40. The middle distillate-hydrotreating reactor 61 is connected to a middle portion of the first fractionator 40. The naphtha fraction-hydrotreating reactor 62 is connected to the upper portion of the first fractionator 40. The vapor-liquid separators 63, 64, and 65 are provided corresponding to the hydrogenating reactors 60, 61, and 62, respectively. The second fractionator 70 fractionally distills the liquid hydrocarbons supplied from the vapor-liquid separators 63 and 64 according to boiling points. The naphtha stabilizer 72 refines liquid hydrocarbons of the naphtha fraction supplied from the vapor-liquid separator 65 and the second fractionator 70, discharges gas components of $C_4$ or less as flare gas, and recovers components having a carbon number of five or more as a naphtha product.

Next, a process (GTL process) of synthesizing liquid fuel from natural gas by the synthesis reaction system 1 configured as above will be described.

Natural gas (the main component of which is $CH_4$) as hydrocarbon feedstock is supplied to the synthesis reaction system 1 from an external natural gas supply source (not shown), such as a natural gas field or a natural gas plant. The synthesis gas production unit 3 reforms this natural gas to produce synthesis gas (mixed gas including carbon monoxide gas and hydrogen gas as main components).

First, the natural gas is supplied to, the desulfurization reactor 10 together with the hydrogen gas separated by the hydrogen separator 26. The desulfurization reactor 10 hydrogenates a sulfur compound included in the natural gas by using the hydrogen gas, with a well-known hydrodesulfurization catalyst, so as to be converted into hydrogen sulfide, and further adsorbs and removes this hydrogen sulfide with an adsorbent, such as zinc oxide, thereby performing desulfurization of the natural gas. By desulfurizing the natural gas in advance in this way, it is possible to prevent the activity of catalysts used in the reformer 12, the bubble column slurry bed reactor 30, the upgrading unit 7, and the like from decreasing due to the sulfur compound.

The natural gas (may also include carbon dioxide gas) desulfurized in this way is supplied to the reformer 12 after the carbon dioxide ($CO_2$) gas supplied from a carbon-dioxide gas supply source (not shown) and the steam generated in the waste heat boiler 14 are mixed with each other. The reformer 12 reforms natural gas using carbon dioxide gas and steam, for example, by the steam and carbon-dioxide-gas reforming method to produce high-temperature synthesis gas including carbon monoxide gas and hydrogen gas as main components. At this time, the reformer 12 is supplied with, for example, fuel gas and air for a burner included in the reformer 12, and the reaction heat required for the aforementioned steam and carbon-dioxide-gas reforming reaction that is an endothermic reaction is provided by the combustion heat of the fuel gas in the burner and the radiant heat within the furnace of the reformer 12.

The high-temperature synthesis gas (for example, 900° C., 2.0 MPaG) produced in the reformer 12 in this way is supplied to the waste heat boiler 14, and is cooled (for example, 400° C.) by the heat exchange with water that flows within the waste heat boiler 14, whereby the waste heat is recovered. At this time, the water heated by the synthesis gas in the waste heat boiler 14 is supplied to the vapor-liquid separator 16. From this vapor-liquid separator 16, a gas component is supplied to the reformer 12 or other external devices as high-pressure steam (for example, 3.4 to 10.0 MPaG), and the water as a liquid component is returned to the waste heat boiler 14.

On the other hand, the synthesis gas cooled in the waste heat boiler 14 is supplied to the absorption tower 22 of the $CO_2$ removal unit 20 or the bubble column slurry bed reactor 30 after a condensate component thereof is separated and removed in the vapor-liquid separator 18. The absorbent stored in the absorption tower 22 absorbs the carbon dioxide gas included in the synthesis gas, to separate the carbon dioxide gas from the synthesis gas. The absorbent including the carbon dioxide gas within the absorption tower 22 is introduced into the regeneration tower 24, the absorbent including the carbon dioxide gas is heated by, for example, steam thereby being subjected to stripping treatment, and the resulting stripped carbon dioxide gas is transferred to the reformer 12 from the regeneration tower 24 and is reused for the aforementioned reforming reaction.

The synthesis gas produced in the synthesis gas production unit 3 in this way is supplied to the bubble column slurry bed reactor 30 of the aforementioned FT synthesis unit 5 via the supply line 49 shown in FIG. 2. At this time, the composition ratio of the synthesis gas supplied to the bubble column slurry bed reactor 30 is adjusted to a composition ratio (for example, $H_2$:CO=2:1 (molar ratio)) suitable for the FT synthesis reaction. In addition, in the present embodiment, this synthesis gas becomes a refrigerant that cools the gas component, which is extracted from the gaseous phase portion of the bubble column slurry bed reactor 30, in the heat exchange section 84. Accordingly, a configuration in which preliminary cooling is performed if necessary in order to cool this gas component to a desired temperature may be adopted. Additionally, this synthesis gas may be boosted to a pressure (for example, 3.6 MPaG) suitable for the FT synthesis reaction by a compressor (not shown) provided at the line that connects the $CO_2$ removal unit 20 and the bubble column slurry bed reactor 30.

Additionally, a portion of the synthesis gas, the carbon dioxide gas of which has been separated by the aforementioned $CO_2$ removal unit 20, is also supplied to the hydrogen separator 26. The hydrogen separator 26 separates the hydrogen gas included in the synthesis gas, by adsorption and desorption (hydrogen PSA) utilizing a pressure difference as mentioned above. This separated hydrogen gas is continuously supplied from a gas holder (not shown) or the like via a compressor (not shown) to various hydrogen-utilizing reaction units (for example, the desulfurization reactor 10, the wax fraction-hydrocracking reactor 60, the middle distillate-hydrotreating reactor 61, the naphtha fraction-hydrotreating reactor 62, and the like) that perform predetermined reactions by utilizing the hydrogen gas within the synthesis reaction system 1.

Next, the aforementioned FT synthesis unit 5 synthesizes hydrocarbons by the FT synthesis reaction from the synthesis gas produced by the aforementioned synthesis gas production unit 3. Hereinafter, an embodiment of the hydrocarbon-producing method of the invention will be described on the basis of the hydrocarbon synthesis method using the FT synthesis reaction.

In the normal operation of the FT synthesis unit 5, the synthesis gas produced in the synthesis gas production unit 3 is supplied by the supply line 49. In that case, recycling gas including the synthesis gas that is unreacted in the reactor 30 joins the supply line 49 further through the recycle line (not shown) from the discharging line 88. Accordingly, after the synthesis gas is mixed with such recycling gas, the synthesis gas performs heat exchange with the gas discharge component, which is extracted from the reactor 30, thereby being heated in, the heat exchange section 84. Then, the heated synthesis gas flows into the bottom of the reactor body 80 that constitutes the bubble column slurry bed reactor 30, and ascends as bubbles through the slurry held within the reactor body 80.

In that case, within the reactor body 80, the carbon monoxide gas and hydrogen gas that are included in the synthesis gas react with each other by the aforementioned FT synthesis reaction to produce hydrocarbons. In addition, as mentioned above, the flow rate of the mixed gas of the synthesis gas supplied by the supply line 49 and the aforementioned recycling gas is measured by the flow meter (not shown) before flowing into the reactor body 80, and the concentration of the carbon monoxide gas included in the mixed gas is measured by the gas chromatograph device (not shown). Then, the molar flow rate (inlet CO molar flow rate) of the carbon monoxide gas that flows into the reactor body 80 per unit time is calculated from these values.

Additionally, during this synthesis reaction, the reaction heat of the FT synthesis reaction is removed by causing water to flow through the cooling line 81. The water heated by this heat exchange vaporizes and is turned into steam. Water of a liquid included in this steam is separated by the vapor-liquid separator 32 and returned to the cooling line 81, and a gas component therein is supplied to an external device as middle-pressure steam (for example, 1.0 to 2.5 MPaG).

A portion of the slurry, which contains the liquid hydrocarbons and the catalyst particles, within the reactor body 80 of the reactor 30 is extracted via the outflow line 34a from the middle portion of the reactor body 80, as shown in FIG. 2, and is introduced into the external catalyst separator 34. In the external catalyst separator 34, the introduced slurry is filtrated by the filter 52, and thereby the catalyst particles are trapped. This separates the slurry into a solid component and a liquid component including heavy oil. Hydrocarbon oil is appropriately caused to flow through the filter 52 of the external catalyst separator 34 in a direction opposite to a normal flow direction, in order to remove the trapped catalyst particles from a filter surface and return the removed catalyst particles to the reactor body 80. At this time, the catalyst particles trapped by the filter 52 are returned to the reactor body 80 via the return line 34b together with a portion of the liquid hydrocarbons.

Additionally, the gas discharge component extracted from the gaseous phase portion 82 of the reactor body 80 flows into the vapor-liquid separator 36 after being cooled by the heat exchange with the synthesis gas (including the recycling gas), which is supplied to the reactor body 80, in the heat exchange section 84 through the extraction line 83. In addition, the flow rate of the gas component, which flows through the discharging line 88 through which the gas component is discharged from the vapor-liquid separator 36, is measured by the flow meter, and the concentration of the carbon monoxide gas included in the gas component is measured by the gas chromatograph device. From these values, the molar flow rate (outlet CO molar flow rate) of the carbon monoxide gas extracted per unit time from the extraction line 83 connected to the top of the reactor body 80 is calculated. As a result, the reaction conversion rate in the reactor 30 is continuously or periodically calculated and monitored.

In addition, in the normal operation of the FT synthesis unit 5, this reaction conversion rate is about 30% to 70%, and the reaction conversion rate typically does not become 20% or less unless the FT synthesis unit is at start-up when supply of the synthesis gas is started, or in other unsteady operations.

The gas discharge component, which has flowed into the vapor-liquid separator 36 from the top of the reactor body 80, is further cooled by the second cooler 85a of the second vapor-liquid separation unit 85, and flows into the second vapor-liquid separation tank 85b in a vapor-liquid mixed state. The vapor-liquid mixture that has flowed into the second vapor-liquid separation tank 85b is separated into vapor and liquid in the tank 85b, and a separated liquid component, that is, a heavy component of light oil, is discharged from the second discharging line 85d. The heavy component of the light oil led out to the second discharging line 85d flows into the line 89, and then flows into the first fractionator 40 through the line 41.

In addition, in the present embodiment, the heavy component of the light oil is basically controlled by a control valve (not shown) provided at the second return line 85e so as not to be led out to the second return line 85e in the normal operation.

Additionally, the gas component, which flows into the second vapor-liquid separation tank 85b, is separated from the liquid component, and then flows through the connection line 87, is further cooled by the first cooler 86a of the first vapor-liquid separation unit 86 and flows into the first vapor-liquid separation tank 86b in a vapor-liquid mixed state. The vapor-liquid mixture that has flowed into the first vapor-liquid separation tank 86b is separated into vapor and liquid in the tank 86b, and a separated liquid component, that is, a light component of light oil, is discharged from the first discharging line 86d. When the FT synthesis unit 5 is in the normal operation, the switching valve 90 provided at the first discharging line 86d is set to a mode where the total amount of the light component of the light oil that flows through the first discharging line 86d is discharged to the line 89.

Accordingly, the light component of the light oil that flows through the first discharging line 86d flows through the line 89, and then flows into the first fractionator 40 through the line 41, similar to the heavy component of the light oil that flows through the second discharging line 85d. In addition, the gas component separated in the first vapor-liquid separation tank 86b is discharged from the discharging line 88 as mentioned above. Additionally, the water that is produced as a by-product within the reactor 30 is included in the liquid component that flows into the first vapor-liquid separation tank 86b. Accordingly, it is preferable to provide a water-draining line (not shown) at the bottom of the first vapor-liquid separation tank 86b.

The gas component, which is separated from the liquid component in the first vapor-liquid separation tank 86b and is discharged through the discharging line 88, has, as main components, the synthesis gas that is unreacted within the reactor body 80 as mentioned above and the gaseous hydrocarbons of $C_4$ or less produced by the FT synthesis reaction. Accordingly, when the FT synthesis unit 5 is in the normal operation, the gas component discharged to the discharging line 88 is supplied to the synthesis gas supply line 49 by the recycle line (not shown), is mixed with synthesis gas that is newly supplied, is recycled to the reactor body 80, and is again provided for the FT synthesis reaction.

Additionally, at least a portion of the gas component discharged by the discharging line 88 is incinerated as flare gas or the like.

On the other hand, for example, in the previous stage of the start-up or when the FT synthesis reaction needs to be temporarily stopped for a particular reason, the operation of circulating nitrogen gas within the reaction system without supplying the synthesis gas (source gas) as mentioned above may be performed. Additionally, for example, in a midway stage shifting from the operation of circulating the nitrogen gas to the normal operation, the operation of supplying the synthesis gas, but setting the reactor temperature to a temperature lower than that in the normal operation, thereby keeping the FT synthesis reaction from proceeding substantially or setting the reaction conversion rate of carbon monoxide gas to a significantly lower value than that in the normal operation may be performed.

When such an unsteady operation is performed, wax may adhere to a cooler of the vapor-liquid separator 36, particularly, the first cooler 86a of the first vapor-liquid separation unit 86 at the subsequent stage (last stage), and be accumulated in the cooler, heat transfer may deteriorate, and the temperature of an outlet of the cooler may rise beyond a normal operation temperature (about 45° C.). The cause of such adhesion of the wax within the cooler is considered to be because the amount of the light component of the light oil that flows through the cooler decreases significantly and, thereby, the effect of "flushing" the adhered wax is significantly lowered, when the FT synthesis reaction does not proceed substantially in the unsteady operation or when the reaction conversion rate decreases significantly, whereas a light component of light oil condensed by the cooler flows through the cooler in large quantities when the FT synthesis unit 5 is in the normal operation.

Thus in the present embodiment, when an operation in which the FT synthesis reaction does not proceed substantially or an operation in which the reaction conversion rate is 20% or less is performed in the reactor 30, the control valve provided at the second return line 85e is switched, and a portion of the heavy component of the light oil is discharged from the bottom of the second vapor-liquid separation tank 85b to the second return line 85e. The led-out heavy component of the light oil is pumped by the pump 94, is cooled to a predetermined temperature by the cooler 95 within the second return line, and is then returned to the top side (upper side) above the filling material layer 93 of the second vapor-liquid separation tank 85b. Then, the gas component in the discharge component, which flows in from the second line 85c and ascends within the second vapor-liquid separation tank 85b, and the heavy component of the light oil, which is returned by the second return line 85e and is rained in the shape of a shower into the filling material layer 93, performs vapor liquid contact at high efficiency in the filling material layer 93 within the second vapor liquid separation tank 85b.

As a result, the wax component included (entrained) in the gas component as vapor, droplets, or the like is absorbed well and liquefied in the returned heavy component of the light oil and is discharged from the bottom of the second vapor-liquid separation tank 85b. That is, a portion of the wax component flows into the first fractionator 40 through the line 89 and the line 41 from the second discharging line 85d. The remainder is led out to the second return line 85e and is circulated to the second vapor-liquid separation tank 85b. In addition, although the recycling operation of the heavy component of light oil by such a second return line 85e is basically performed only in an unsteady operation, the recycling operation may be performed even in the normal operation.

Additionally, in the aforementioned unsteady operation, in the first vapor-liquid separation unit 86, the switching valve 90 provided at the first discharging line 86d is switched, and a portion or whole of the light components of the light oil that flows through the first discharging line 86d flows into the first return line 91. The amount of the light components of the light oil flowing into the first return line 91 is appropriately determined depending on the conversion rate or the like. That is, the switching valve 90 is adjusted so as to provide the light components of the light oil having such an amount that a sufficient flushing effect is obtained with respect to the wax adhered to and accumulated in the first cooler 86a or on the upstream side thereof.

If the switching valve 90 is switched in this way, the light component of the light oil having a predetermined amount flows into the first return line 91, and further flows into the top side (upper side) of the second vapor-liquid separation tank 85b above the return-location from the second return line 85e through the first return line 91. Then, since the cloud point (CP) of the light component of the light oil that flows into the second vapor-liquid separation tank 85b through the first return line 91 is lower than the outlet temperature of the first cooler 86a, the wax adhered to the top side of the second vapor-liquid separation tank 85b, the wax adhered to the inside of the connection line 87, and the wax adhered to the first cooler 86a can be re-melted and flushed by the light component of the light oil. Additionally, wax can be prevented from newly adhering.

In addition, since the wax adhered to the top side of the second vapor-liquid separation tank 85b or the connection line 87 is slight and most of the wax adheres to the first cooler 86a, the wax adhered to the first cooler 86a is substantially re-melted and flushed by the light component of the light oil.

Additionally, although the heavy component of the light oil is recycled to the second vapor-liquid separation tank 85b by the second return line 85e and the light component of the light oil is recycled to the second vapor-liquid separation tank 85b by the first return line 91, since the heavy component of the light oil is introduced into the inside of the filling material layer 93 or into the top side above the filling material layer 93 and the light component of the light oil is introduced into the top side above the return-location from the second return line 85e, these heavy and light components are not mixed with each other. Accordingly, the heavy component of the light oil is prevented from being entrained in the light component of the light oil and flowing to the first vapor-liquid separation unit 86 side.

In the present embodiment, regarding a period during which the heavy component of the light oil is recycled to the second vapor-liquid separation tank 85b by the second return line 85e or the light component of the light oil is returned (supplied) to the second vapor-liquid separation tank 85b by the first return line 91, the case of the start-up of the FT synthesis unit 5 will be described below as an example.

In the start-up of the FT synthesis unit 5, as a stage prior to a stage of supplying source gas (synthesis gas) to the reactor 30, typically, nitrogen gas is circulated within the system of the reactor 30 holding the slurry, and thereby the flow of the slurry is secured. Although the FT synthesis reaction does not proceed in this stage, a portion of the heavy oil included in the liquid hydrocarbons that constitutes the slurry vaporizes and is entrained in the gas discharge component having, as a main component, the nitrogen gas discharged from the top of the reactor body 80 to the extraction line 83.

Since heavy oil that hardly includes a light component is generally used as the liquid hydrocarbons that constitute the slurry in the start-up, the light component in the heavy oil discharged from the extraction line 83 is scarce, and accordingly, the amount of the light component of the light oil condensed by the cooler is scarce. For this reason, in the operation of circulating this nitrogen gas, wax is apt to adhere to the first cooler 86a or the like. In order to prevent the adhesion of the wax, in an operation period during which the circulation of this nitrogen gas is performed, the heavy component of the light oil stored in advance in the second vapor-liquid separation tank 85b may be recycled to the second vapor-liquid separation tank 85b by the second return line 85e, and the light component of the light oil stored in advance in the first vapor-liquid separation tank 86b may be recycled to the second vapor-liquid separation tank 85b by the first return line 91.

In the start-up of the FT synthesis unit 5, next supply of the synthesis gas to the reactor 30 is started. Generally, even if the supply of the synthesis gas is started, setting the reaction conversion rate to the value of the normal operation immediately is not performed so that the FT synthesis reaction that is an exothermic reaction is not brought into a runaway state, but the operation of gradually increasing the reaction conversion rate is performed. Even in this stage, production of new hydrocarbons is significantly scarce compared to the normal operation. Additionally, since the reaction temperature is set low, the carbon number of hydrocarbons to be produced becomes as large as the characteristic of the FT synthesis reaction (the heavy hydrocarbons are relatively largely produced).

Accordingly, even in this operating period, wax is apt to adhere to the cooler of the vapor-liquid separator 36. Hence, in order to prevent the adhesion of the wax in this period, the heavy component of the light oil stored in advance in the second vapor-liquid separation tank 85b may be recycled to the second vapor-liquid separation tank 85b through the second return line 85e, and the light component of the light oil stored in advance in the first vapor-liquid separation tank 86b may be recycled to the second vapor-liquid separation tank 85b through the first return line 91.

Generally, a period during which the wax adheres to the cooler (for example, the first cooler 86a) of the vapor-liquid separator 36 is a period during which the FT synthesis reaction does not proceed substantially and a period during which the reaction conversion rate is 20% or less, and, particularly a period during which the wax adheres easily is the period during which the FT synthesis reaction does not proceed substantially and a period during which the reaction conversion rate is 10% or less. Accordingly, in the present embodiment, as a period during which the heavy component of the light oil is recycled to the second vapor-liquid separation tank 85b through the second return line 85e and the light component of the light oil is recycled to the second vapor-liquid separation tank 85b through the first return line 91, the period during which the FT synthesis reaction does not proceed substantially and the reaction conversion rate is 20% or less is preferable, and the period during which the FT synthesis reaction does not proceed substantially and the reaction conversion rate is 10% or less is especially preferable.

Within the aforementioned period, the recycling of the heavy component of the light oil through the second return line 85e and the recycling of the light component of the light oil through the first return line 91 may be performed in arbitrary periods. For example, the recycling of the heavy component of the light oil and the recycling of the light component of the light oil may not be performed at the beginning of the startup, the outlet temperature of the cooler 86a is monitored, and the recycling of the heavy component of the light oil and the recycling of the light component of the light oil may be started in a stage where the rise of the temperature is observed.

Otherwise, in a stage where the circulation of the nitrogen gas is performed, the recycling of the heavy component of the light oil and the recycling of the light component of the light oil may be started, the supply of the synthesis gas may be started thereafter, the reaction conversion rate may be increased, and the recycling of the heavy component of the light oil and the recycling of the light component of the light oil may be performed continuously until the reaction conversion rate reaches 20%. By adopting such an embodiment, the adhesion of the wax to the cooler can be prevented most reliably.

Otherwise, in a stage where the reaction conversion rate reaches 10%, for example, the recycling of the heavy component of the light oil and the recycling of the light component of the light oil may be stopped. In addition, depending on cases, even in a stage where the reaction conversion rate exceeds 20%, the recycling of the heavy component of the light oil and the recycling of the light component of the light oil may continue. However, generally, when the reaction conversion rate exceeds 20%, the adhesion of the wax to the first cooler 86a or the like no longer occurs even if the recycling of the heavy component of the light oil and the recycling of the light component of the light oil are stopped. It is estimated that this is because the production of the light hydrocarbons by the FT synthesis reaction increases, the amount of the light component of the light oil that condenses within the first cooler 86a and flows through the first cooler 86a increases, and the "flushing" effect becomes sufficient.

The recycling of the heavy component of the light oil and the recycling of the light component of the light oil can be performed or stopped according to the reaction conversion rate as mentioned above by continuously or periodically monitoring the reaction conversion rate in the reactor 30. Additionally, by monitoring the outlet temperature of the first cooler 86a, the recycling of the heavy component of the light oil and the recycling of the light component of the light oil may be performed or stopped.

In addition, the outlet temperature of the first cooler 86a can be continuously monitored by, for example, the temperature sensor (not shown) provided at the first line 86c. The start timing of the recycling of the light component of the light oil to the first return line 91 may be determined depending on the outlet temperature. Moreover, when the recycling of the light component of the light oil to the first return line 91 is being performed, the effect thereof can be determined based on the outlet temperature, and the flow rate of a light component of light oil to be recycled can also be adjusted on the basis of this. Additionally, it is also preferable to measure the cloud point of the light component of the light oil that is being recycled and to confirm that the cloud point is lower than the outlet temperature.

Next, the first fractionator 40 fractionally distills the heavy oil supplied via the external catalyst separator 34 from the reactor 30 as mentioned above, and the liquid hydrocarbons supplied via the vapor-liquid separator 36, and separates the heavy oil and the liquid hydrocarbons into a naphtha fraction (the boiling point of which is lower than about 150° C.), a middle distillate (the boiling point of which is about 150° C. to 360° C.), and a wax fraction (the boiling point of which exceeds about 360° C.). The liquid hydrocarbons (mainly $C_{22}$ or more) of the wax fraction derived from the bottom of the first fractionator 40 are transferred to the wax fraction-hydrocracking reactor 60, the liquid hydrocarbons (mainly $C_{11}$ to $C_{21}$) of the middle distillate derived from the middle portion of the first fractionator 40 are transferred to the middle distillate-hydrotreating reactor 61, and the liquid hydrocarbons (mainly $C_5$ to $C_{10}$) of the naphtha fraction derived from the upper portion of the first fractionator 40 are transferred to the naphtha fraction-hydrotreating reactor 62.

The wax fraction-hydrocracking reactor 60 hydrocracks the liquid hydrocarbons (approximately $C_{22}$ or more) of the wax fraction with a large carbon number, which are supplied from the bottom of the first fractionator 40, using the hydrogen gas supplied from the aforementioned hydrogen separator 26 to reduce the carbon number of the hydrocarbons to 21 or less. In this hydrocracking reaction, the hydrocarbons with a small carbon number and a low molecular weight are produced by cleaving C—C bonds of the hydrocarbons with a large carbon number, using a catalyst and heat. A product including the liquid hydrocarbons hydrocracked by the wax fraction-hydrocracking reactor 60 is separated into gas and liquid in the vapor-liquid separator 63, the liquid hydrocarbons separated from the product are transferred to the second fractionator 70, and the gas component (including hydrogen gas) separated from the product is transferred to the middle distillate-hydrotreating reactor 61 and the naphtha fraction-hydrotreating reactor 62.

The middle distillate-hydrotreating reactor 61 hydrotreats the liquid hydrocarbons (approximately $C_{11}$ to $C_{21}$) of the middle distillate with an approximately middle carbon number, which have been supplied from the middle portion of the first fractionator 40, using the hydrogen gas supplied via the wax fraction-hydrocracking reactor 60 from the hydrogen separator 26. In this hydrotreating reaction, mainly in order to obtain branched saturated hydrocarbons for the purpose of improving the low-temperature flowability as a fuel oil base material, the liquid hydrocarbons are hydroisomerized, and unsaturated hydrocarbons included in the aforementioned liquid hydrocarbons are hydrogenated so as to become saturated. Moreover, oxygenated compounds, such as alcohols included in the aforementioned hydrocarbons, are hydrogenated and converted into saturated hydrocarbons. A product including the liquid hydrocarbons hydrotreated in this way is separated into gas and liquid in the vapor-liquid separator 64, the liquid hydrocarbons separated from the product are transferred to the second fractionator 70, and the gas component (including hydrogen gas) separated from the product is reused for the aforementioned hydrogenation reactions.

The naphtha fraction-hydrotreating reactor 62 hydrotreats liquid hydrocarbons (approximately $C_{10}$ or less) of the naphtha fraction with a small carbon number, which have been supplied from the upper portion of the first fractionator 40, using the hydrogen gas supplied via the wax fraction-hydrocracking reactor 60 from the hydrogen separator 26. As a result, unsaturated hydrocarbons and oxygenated compounds, such as alcohols, which are included in the supplied naphtha fraction, are converted into saturated hydrocarbons. A product including the liquid hydrocarbons hydrotreated in this way is separated into gas and liquid in the vapor-liquid separator 65, the liquid hydrocarbons separated from the product are transferred to the naphtha stabilizer 72, and the gas component (including hydrogen gas) separated from the product is reused for the aforementioned hydrogenation reactions.

Next, the second fractionator 70 fractionally distills the liquid hydrocarbons hydrocracked and hydrotreated in the wax fraction-hydrocracking reactor 60 and the middle distillate-hydrotreating reactor 61, respectively, as described above, into hydrocarbons with a carbon number of $C_{10}$ or less (the boiling point of which is lower than about 150° C.), a kerosene fraction (the boiling point of which is about 150 to 250° C.), a gas oil fraction (the boiling point of which is about 250 to 360° C.), and an untracked wax fraction (the boiling point of which exceeds about 360° C.) from the wax fraction-hydrocracking reactor 60. The gas oil fraction is derived from a lower portion of the second fractionator 70, and the kerosene fraction is derived from a middle portion of the second fractionator 70. On the other hand, the hydrocarbons with a carbon number of $C_{10}$ or less are derived from the top of the second fractionator 70, and are supplied to the naphtha stabilizer 72.

Moreover, the naphtha stabilizer 72 distills the hydrocarbons with a carbon number of $C_{10}$ or less which have been supplied from the aforementioned naphtha fraction-hydrotreating reactor 62 and second fractionator 70 to separate and refine naphtha ($C_5$ to $C_{10}$) as a product. As a result, high-purity naphtha is derived from the bottom of the naphtha stabilizer 72. On the other hand, flare gas other than target products, which includes hydrocarbons with a carbon number equal to or less than a predetermined number ($C_4$ or less) as a main component, is discharged from the top of the naphtha stabilizer 72. This flare gas is introduced into an external combustion facility (not shown), is combusted, and is then released to the atmosphere.

According to the hydrocarbon-producing apparatus of the present embodiment and the production method using the same, the middle portion within the second vapor-liquid separation tank 85b of the second vapor-liquid separation unit 85 is provided with the filling material layer 93, and the second vapor-liquid separation tank 85b is provided with the second return line 85e that returns the heavy component of the light oil discharged from the bottom of the second vapor-liquid separation tank 85b to the inside of the filling material layer 93 of the second vapor-liquid separation tank 85b or to the top side above the filling material layer 93. Thus, vapor, droplets, or the like in the heavy component in the introduced hydrocarbons can be absorbed well in the heavy component of the light oil by bringing the gas component in the hydrocarbons introduced into the second vapor-liquid separation tank 85l) and the heavy component of the light oil returned to the inside of and the filling material layer 93 or to the top side above the filling material layer 93 into vapor-liquid contact with each other in the filling material layer 93. This can prevent the heavy component, which is a wax component in the hydrocarbons, from flowing out of the top of the second vapor-liquid separation tank 85b as vapor, droplets, or the like, and flowing to the first vapor-liquid separation unit 86 side at the last stage.

Additionally, since the first vapor-liquid separation tank 86b of the first vapor-liquid separation unit 86 is provided with the first return line 91 that returns the light component of the light oil discharged from the bottom of the first vapor-liquid separation tank 86b to the top side above the return-location from the second return line 85e within the second vapor-liquid separation tank 85b, wax can be reliably prevented from being adhered to a portion between the top side above the return-location from the second return line 85e within the second vapor-liquid separation tank 85b, and the first cooler 86a, and the adhered wax can be removed.

Moreover, even when a prolonged standby operation is performed, the second return line 85e is provided to thereby keep the wax component from being included in the hydrocarbons that flow out of the top of the second vapor-liquid separation tank 85b and prevent the wax component from flowing to the first vapor-liquid separation unit side at the last stage. Thus, the wax component can be prevented from being condensed in the light component of the light oil that flows and circulates through the first return line 91.

Hence, occurrence of problems accompanying adhesion of wax can be more reliably prevented without causing a decline in the operation rate of the FT synthesis unit, enlargement of facilities, and an increase in facility costs.

Additionally, in the cooler 95 within the second return line, the heavy component of the light oil sent from the pump 94 is cooled to the target temperature of 80° C. or higher, wherein the target temperature is equal to or lower than the predetermined temperature caused by the second cooler 85a of the second vapor-liquid separation unit 85. Thus, the heavy component of the light oil returned to the inside of the second vapor-liquid separation tank 85b can be prevented from vaporizing and flowing to the first vapor-liquid separation unit 86 side. That is, since the temperature of the heavy component of the light oil pumped by the pump 94 rises due to compression heat, the temperature of the heavy component tends to become higher than the temperature of the discharge component that flows into the second vapor-liquid separation tank 85b from the second cooler 85a. However, as the heavy component of the light oil is cooled by the cooler 95 within the second return line, the heavy component of the light oil can be reliably prevented from vaporizing as mentioned above.

In addition, in the aforementioned embodiment, the production method of the invention is carried out using the FT synthesis unit 5 in which the filter 52 that filtrates the slurry is arranged within the separation tank 50 of the external catalyst separator 34. However, the invention is not limited to this, and hydrocarbons may be produced using an FT synthesis unit 100 provided with an internal catalyst-separating mechanism in which the filter 52 is arranged within the reactor 30, as shown in FIG. 3.

Figure 3:
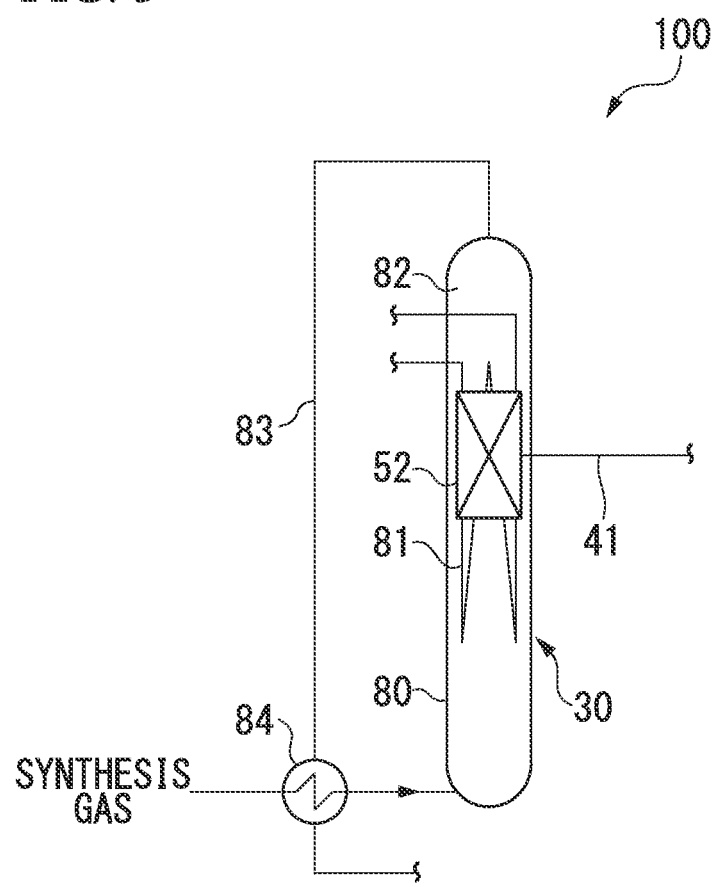
FIG. 3 is a schematic configuration view of a modification example of the FT synthesis unit related to the invention.

The FT synthesis unit 100 shown in FIG. 3 is different from the FT synthesis unit 5 shown in FIG. 2 in that, instead of the external catalyst separator 34, the filter 52 is provided within the reactor 30 and the internal catalyst-separating mechanism is formed in the reactor 30. This catalyst-separating mechanism has the same configuration as the configuration in which the filter 52 provided in the separation tank 50 of the external catalyst separator 34 shown in FIG. 2 is a main element.

Additionally, as the FT synthesis unit that carries out the production method of the invention, one using the external type and the internal type together as the catalyst separating mechanisms can also be used. That is, the production method of the invention can be carried out using an FT synthesis unit of a configuration including the external catalyst separator 34 shown in FIG. 2 and including the filter 52 within the reactor 30 as shown in FIG. 3.

Moreover, in the aforementioned embodiment, natural gas is used for the hydrocarbon feedstock supplied to the liquid fuel-synthesizing system 1. However, for example, other hydrocarbon feedstock, such as asphalt or residual oil, may be used. Additionally, although a mode in which the production method of the invention is carried out using the liquid fuel-synthesizing system 1 has been described in the aforementioned embodiment, the invention can be applied to a hydrocarbon-producing method that synthesizes hydrocarbons by contact with a synthesis gas having at least hydrogen gas and carbon monoxide gas as main components and a slurry including catalyst particles.

Although the embodiment of the invention has been described above in detail with reference to the drawings, the specific configuration is not limited to the embodiment, and design changes or the like are also included without departing from the scope of the invention.

EXAMPLES

In the bubble column slurry bed reactor 30 shown in FIG. 2, the operation with a carbon monoxide conversion rate significantly lower than that in the normal operation was carried out as the start-up.

Here, a case where the first return line 91 has one end (terminal) connected to the top side above the filling material layer 93 of the second vapor-liquid separation tank 85*b* as shown by a solid line in FIG. 2 was adopted as First Example.

Additionally, a case where the first return line 91 has one end (terminal) connected to the connection line 87 (directly connected with the first cooler 86*a*) as shown by a dashed line in FIG. 2 was adopted as Second Example.

Additionally, a case where, in the device configuration shown in FIG. 2, the recycling of the heavy component of the light oil by the second return line 85*e* is not performed and only the recycling of the light component of the light oil to the second vapor-liquid separation tank 85*b* by the first return line 91 is performed was adopted as First Comparative Example.

Moreover, a case where both of the recycling of the light component of the light oil by the first return line 91 and the recycling of the heavy component of the light oil by the second return line 85*e* are not performed was adopted as Second Comparative Example.

In the aforementioned respective examples, the synthesis gas ($CO:H_2$ Molar Ratio=1:2) supplied from the synthesis gas production unit as the feedstock was supplied to the bubble column slurry bed reactor 30, operation was performed with the reaction temperature being 180° C. to 190° C., and the reaction conversion rate of carbon monoxide when the carbon monoxide passes through the reactor 30 was set to 5% to 10%.

In the aforementioned respective examples, after 72 hours from starting the operation, the outlet temperatures of the first cooler 86*a* were measured, respectively, and the light components of the light oils that came out from the first cooler 86*a* were sampled and the properties thereof were observed visually.

As a result, in both of First Example and Second Example, it was confirmed that a rise in the outlet temperature of the first cooler 86*a* was not observed and the first cooler 86*a* functioned well. Additionally, it was confirmed that the light components of the sampled light oils were transparent and that the wax component does not solidify but dissolves in the light component of the light oil. Accordingly, in both of First Example and Second Example, it was found that adhesion of the wax in the first cooler 86*a* did not take place and the first cooler 86*a* functioned normally.

On the other hand, in First Comparative Example, a rise in the outlet temperature of the first cooler 86*a* was not observed, but clouding was observed in the light component of the sampled light oil. It is believed that this is because the recycling of the heavy component of the light oil by the second return line 85*e* is not performed in First Comparative Example; therefore, the total amount of the wax component that has flowed to the first vapor-liquid separation unit 86 side increases with the lapse of time and thereby solidification of the wax component begins to occur in the hydrocarbons that have passed through the first cooler 86*a*.

That is, it is believed that this is because the recycling of the heavy component of the light oil by the second return line 85*e* is performed in First Example and Second Example; therefore, the total amount of the wax components that flow to the first vapor-liquid separation unit 86 side hardly increases and thereby the wax component does not solidify in the hydrocarbons that have passed through the first cooler 86*a* as mentioned above and is maintained in a dissolved state.

Additionally, in Second Comparative Example, the outlet temperature of the first cooler 86*a* rose greatly. It is believed that this is because the recycling of the heavy component of the light oil by the second return line 85*e* is not performed even in Second Comparative Example; therefore, the total amount of the wax component that has flowed to the first vapor-liquid separation unit 86 side increases with the lapse of time and because the recycling of the light component of the light oil by the first return line 91 is not performed; therefore, the flushing-out effect for the wax adhered to the first cooler 86*a* is hardly obtained.

As described above, it becomes clear that, when the operation in which the reaction conversion rate of the carbon monoxide is low is performed in the bubble column slurry bed reactor 30, the cooling efficiency of the first cooler 86*a* can be kept equal to that in the normal operation by recycling the heavy component of the light oil with the second return line 85*e* and recycling the light component of the light oil with the first return line 91.

INDUSTRIAL APPLICABILITY

The present invention relates to a hydrocarbon-producing apparatus and a hydrocarbon-producing method by, the Fischer-Tropsch synthesis reaction using a bubble column slurry bed reactor.

According to the invention, problems caused by wax adhered to the cooler of the vapor-liquid separator in an unsteady operation can be prevented.

DESCRIPTION OF THE REFERENCE SIGNS

1: LIQUID FUEL-SYNTHESIZING SYSTEM
5: FT SYNTHESIS UNIT
30: BUBBLE COLUMN SLURRY BED REACTOR (REACTOR)
36: VAPOR-LIQUID SEPARATOR
82: GASEOUS PHASE PORTION
83: EXTRACTION LINE
84: HEAT EXCHANGE SECTION
85: SECOND VAPOR-LIQUID SEPARATION UNIT
85*a*: SECOND COOLER
85*b*: SECOND VAPOR-LIQUID SEPARATION TANK
85*e*: SECOND RETURN LINE (SECOND RETURN LINE)
86: FIRST VAPOR-LIQUID SEPARATION UNIT
86*a*: FIRST COOLER
87: CONNECTION LINE
91: FIRST RETURN LINE (FIRST RETURN LINE),
93: FILLING MATERIAL LAYER
95: COOLER WITHIN SECOND RETURN LINE

The invention claimed is:
1. A hydrocarbon-producing apparatus for producing hydrocarbons by a Fischer-Tropsch synthesis reaction, the hydrocarbon-producing apparatus comprising:

a bubble column slurry bed reactor configured to hold a slurry including catalyst particles and liquid hydrocarbons therein;

a vapor-liquid separator having first and second vapor-liquid separation units, each vapor-liquid separation unit including a cooler and a vapor-liquid separation tank;

a filling material layer installed at a middle portion within the vapor-liquid separation tank of the second vapor-liquid separation unit, a first return line configured to return a portion of a light component of light oil discharged from a bottom of the vapor-liquid separation tank of the first vapor-liquid separation unit to the vapor-liquid separation tank of the second vapor-liquid separation unit; and a second return line configured to return a portion of a heavy component of light oil discharged from a bottom of the vapor-liquid separation tank of the second vapor-liquid separation unit to the middle portion of the vapor-liquid separation tank of the second vapor-liquid separation unit, wherein the second vapor-liquid separation unit is configured to cool gaseous hydrocarbons extracted from a gaseous phase portion above the slurry within the reactor using the cooler of the second vapor-liquid separation unit and to liquefy a portion of the cooled gaseous hydrocarbons in the vapor-liquid separation tank of the second vapor-liquid separation unit, wherein the first vapor-liquid separation unit is configured to cool the gaseous hydrocarbons discharged from the vapor-liquid separation tank of the second vapor-liquid separation unit using the cooler of the first vapor-liquid separation unit and to liquefy a portion of the cooled gaseous hydrocarbons in the vapor-liquid separation tank of the first vapor-liquid separation unit, and wherein in the second vapor-liquid separation unit, the cooled gaseous hydrocarbons are introduced into the bottom of the vapor-liquid separation tank, the heavy component of light oil discharged from the bottom of the vapor-liquid separation tank is recycled to the filling material layer of the vapor-liquid separation tank through the second return line, and the cooled gaseous hydrocarbons are brought into contact with the heavy component of the light oil in the filling material layer within the vapor-liquid separation tank.

2. The hydrocarbon-producing apparatus according to claim 1, wherein the first return line is installed so as to connect the bottom of the vapor-liquid separation tank of the first vapor-liquid separation unit, and the top side above the filling material layer within the vapor-liquid separation tank of the second vapor-liquid separation unit, and wherein the light component of light oil discharged from a bottom of the vapor-liquid separation tank of the first vapor-liquid separation unit is fed to the top side above a return-location from the second return line within the vapor-liquid separation tank of the second vapor-liquid separation unit through the first return line.

3. The hydrocarbon-producing apparatus according to claim 1, wherein the second return line is provided with a pump configured to transfer the heavy component of the light oil, and a cooler within the second return line located on the downstream side of the pump, and the cooler within the second return line is configured to cool the heavy component of the light oil sent from the pump to a target temperature of 80° C. or higher, wherein the target temperature is equal to or lower than a predetermined temperature caused by the cooler of the second vapor-liquid separation unit.

4. The hydrocarbon-producing apparatus according to claim 2, wherein the second return line is provided with a pump configured to transfer the heavy component of the light oil, and a cooler within the second return line located on the downstream side of the pump, and the cooler within the second return line is configured to cool the heavy component of the light oil sent from the pump to a target temperature of 80° C. or higher, wherein the target temperature is equal to or lower than a predetermined temperature caused by the cooler of the second vapor-liquid separation unit.

5. A hydrocarbon-producing method for producing hydrocarbons by a Fischer-Tropsch synthesis reaction using the hydrocarbon-producing apparatus according to claim 1, the hydrocarbon-producing method comprising:

a vapor-liquid separation step of cooling hydrocarbons, which are extracted from a gaseous phase portion at an upper portion of the slurry within the reactor and are gaseous under conditions within the reactor, using the cooler, and liquefying a portion of the hydrocarbons in the vapor-liquid separation tank to perform vapor-liquid separation, wherein while the reaction is stopped in the reactor or while the reaction progresses in which a carbon monoxide reaction conversion rate is 20% or less in the reactor, in the first vapor-liquid separation unit, a light component of light oil discharged from a bottom of the vapor-liquid separation tank is returned to a portion between a top side above a return-location from the second return line within the vapor-liquid separation tank of the second vapor-liquid separation unit, and a line directly connected with the cooler of the first vapor-liquid separation unit, and in the second vapor-liquid separation unit where a cooling temperature caused by the cooler is set to 80° C. to 120° C., a heavy component of light oil discharged from a bottom of the vapor-liquid separation tank of the second vapor-liquid separation unit is returned to the filling material layer of the vapor-liquid separation tank of the second vapor-liquid separation unit or a top side above the filling material layer.

6. The hydrocarbon-producing method according to claim 5, wherein in the first vapor-liquid separation unit, the light component of the light oil discharged from the bottom of the vapor-liquid separation tank is returned to the top side above the filling material layer in the vapor-liquid separation tank of the second vapor-liquid separation unit through the first return line.

7. The hydrocarbon-producing method according to claim 5, wherein the second return line is provided with a pump configured to transfer the heavy component of the light oil, and a cooler within the second return line located on the downstream side of the pump, and in the cooler within the second return line, the heavy component of the light oil sent from the pump is cooled to a target temperature of 80° C. or higher, wherein the target temperature is equal to or lower than a predetermined temperature caused by the cooler of the second vapor-liquid separation unit.

8. The hydrocarbon-producing method according to claim 6, wherein the second return line is provided with a pump configured to transfer the heavy component of the light oil, and a cooler within the second return line located on the downstream side of the pump, and in the cooler within the second return line, the heavy component of the light oil sent from the pump is cooled to a target temperature of 80° C. or higher, wherein the target temperature is equal to or lower than a predetermined temperature caused by the cooler of the second vapor-liquid separation unit.

\* \* \* \* \*